US012747143B2

(12) United States Patent
Shen et al.

(10) Patent No.: US 12,747,143 B2
(45) Date of Patent: Sep. 29, 2026

(54) LIFTING APPARATUS AND LOADING VEHICLE LIFTING SYSTEM

(71) Applicant: CONTEMPORARY AMPEREX TECHNOLOGY CO., LIMITED, Ningde (CN)

(72) Inventors: Yafei Shen, Ningde (CN); Fanke Chen, Ningde (CN); Meng Zhao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 217 days.

(21) Appl. No.: 18/658,996

(22) Filed: May 9, 2024

(65) Prior Publication Data

US 2024/0425335 A1 Dec. 26, 2024

Related U.S. Application Data

(63) Continuation of application No. PCT/CN2023/101868, filed on Jun. 21, 2023.

(51) Int. Cl.
*B66F 9/065* (2006.01)
*B66F 9/20* (2006.01)

(52) U.S. Cl.
CPC ................ *B66F 9/065* (2013.01); *B66F 9/20* (2013.01)

(58) Field of Classification Search
CPC ................................... B66F 9/065; B66F 9/20
See application file for complete search history.

(56) References Cited

U.S. PATENT DOCUMENTS

| | | | | |
|---|---|---|---|---|
| 12,227,218 | B1 * | 2/2025 | Clarke | B66F 9/24 |
| 12,522,486 | B2 * | 1/2026 | Kritzer | B66F 9/065 |
| 2008/0164101 | A1 * | 7/2008 | Stone | B66F 9/06 187/231 |
| 2019/0054902 | A1 | 2/2019 | Martindale | |
| 2020/0299118 | A1 * | 9/2020 | Kurita | B62B 3/0612 |
| 2024/0002174 | A1 * | 1/2024 | Martin | B65G 67/02 |

(Continued)

FOREIGN PATENT DOCUMENTS

| | | |
|---|---|---|
| CN | 108326532 A | 7/2018 |
| CN | 112537610 A | 3/2021 |

(Continued)

OTHER PUBLICATIONS

The Grant Notice of the CN Application No. 20238006540 9.9, dated Nov. 19, 2025, 10 pages with English translation.

(Continued)

*Primary Examiner* — Saul Rodriguez
*Assistant Examiner* — Ashley K Romano
(74) *Attorney, Agent, or Firm* — K&L Gates LLP

(57) ABSTRACT

Provided are a lifting apparatus and a loading vehicle lifting system. The lifting apparatus includes a first actuator having a first actuating rod movable in a first direction, a movable component, and a lifting component, the lifting component being configured to lift an object to be lifted and configured to be able to receive a force exerted by the movable component to move in a second direction, and the second direction being different from the first direction. The loading vehicle lifting system includes the lifting apparatus and a loading vehicle.

17 Claims, 10 Drawing Sheets

(56) References Cited

U.S. PATENT DOCUMENTS

| | | | | | |
|---|---|---|---|---|---|
| 2025/0346470 | A1* | 11/2025 | Bafile | ...................... | B60K 1/00 |
| 2026/0021999 | A1* | 1/2026 | Foroni | .................... | B66F 9/183 |

FOREIGN PATENT DOCUMENTS

| | | | | | |
|---|---|---|---|---|---|
| CN | 112830178 | A | 5/2021 | | |
| CN | 213623101 | U | 7/2021 | | |
| CN | 113334428 | A | 9/2021 | | |
| CN | 214398748 | U | 10/2021 | | |
| CN | 216758690 | U | 6/2022 | | |
| CN | 114940455 | A | 8/2022 | | |
| CN | 115947090 | A | 4/2023 | | |
| CN | 116103630 | A | 5/2023 | | |
| CN | 219136257 | U | 6/2023 | | |
| FR | 3132444 | A1 * | 8/2023 | ............... | B01D 3/32 |
| JP | 2021183530 | A | 12/2021 | | |

OTHER PUBLICATIONS

The international search report received in the counterpart international application PCT/CN2023/101868, mailed on Jan. 13, 2024.
The written opinion of ISA received in the counterpart international application PCT/CN2023/101868, mailed on Jan. 13, 2024.
The extended European search report received in the counterpart European application 23833558.2, mailed on Oct. 21, 2024.

* cited by examiner

LIFTING APPARATUS AND LOADING VEHICLE LIFTING SYSTEM

CROSS REFERENCE TO RELATED APPLICATION

The present application is a continuation of International Application PCT/CN2023/101868, filed on Jun. 21, 2023 and entitled "LIFTING APPARATUS AND LOADING VEHICLE LIFTING SYSTEM", which is incorporated in its entirety herein by reference.

TECHNICAL FIELD

The present application relates to the field of object lifting, and in particular, to a lifting apparatus and a loading vehicle lifting system.

BACKGROUND

Lifting apparatuses are used in many aspects of industrial production and daily life. The lifting apparatus can be used to lift an object from a lower position to a higher position for subsequent manufacturing, assembly, debugging or other tasks.

When the weight of the lifted object is relatively large, the current lifting apparatus is prone to fall under pressure, thereby resulting in poor stability of the lifting apparatus.

SUMMARY OF THE INVENTION

In view of the above problems, the present application provides a lifting apparatus and a loading vehicle lifting system, which can improve the stability of the lifting apparatus.

In a first aspect, the present application provides a lifting apparatus, the lifting apparatus including: a first actuator, the first actuator including a first actuating rod, and the first actuating rod being configured to be movable along a first direction; a movable component, the movable component being connected with the first actuating rod and configured to be movable with motion of the first actuating rod; and a lifting component, the lifting component being configured to lift an object to be lifted, wherein the lifting component is configured to be able to receive a force exerted by the movable component and move in a second direction, and the second direction is different from the first direction. Since the moving direction of the first actuating rod of the first actuator may be different from a lifting direction of the lifting component, even if the lifting component bears excessive pressure, it is not easy to cause the first actuating rod of the first actuator to move under pressure. Therefore, the stability of lifting and the accuracy of positioning are improved.

In some embodiments, the movable component is configured to be able to move in the first direction with the motion of the first actuating rod. The movable component has an inclined surface, and the inclined surface is configured to exert a force on the lifting component when the movable component moves, so that the lifting component moves in the second direction. Due to the inclined surface, it is possible to achieve self-locking in lifting with a simple structure, thereby improving the stability of lifting and the accuracy of positioning.

In some embodiments, an inclination angle of the inclined surface with respect to the first direction may be 10 degrees to 45 degrees. In some embodiments, the inclination angle of the inclined surface with respect to the first direction may be 15 degrees to 30 degrees. In some embodiments, the inclination angle of the inclined surface with respect to the first direction may be 20 degrees to 25 degrees. By properly selecting the inclination angle, the first actuating rod 11 of the first actuator 10 can be better prevented from moving under pressure, thereby better improving the stability of lifting and the accuracy of positioning.

In some embodiments, the first actuating rod is connected to the movable component through a first connecting mechanism. The first connecting mechanism may be configured such that the motion of the first actuating rod is transmitted to the movable component, and the first connecting mechanism is configured such that there is a motion margin in the first direction between the first actuating rod and the movable component. With such a connecting method, the requirements for the machining accuracy of parts are reduced, and the manufacturing costs are reduced.

In some embodiments, the first connecting mechanism may include a connecting rod and a connecting seat. The connecting rod is connected with the first actuating rod, and the connecting seat is connected with the movable component. Such arrangement reduces wear on the main parts and facilitates assembly.

In some embodiments, the connecting rod may have a first position-limiting part with an increased diameter, a second position-limiting part with an increased diameter, and a third part located between the first position-limiting part and the second position-limiting part. The connecting seat may have a groove. The first position-limiting part and the second position-limiting part are respectively located outside the groove on opposite sides and are configured to limit motion of the connecting rod in the first direction. The third part is accommodated in the groove. Such arrangement can improve the stability of the mechanism and facilitate assembly.

In some embodiments, the groove has a length in the first direction. A length of the third part is slightly greater than the length of the groove, so that the connecting rod has the motion margin in the first direction with respect to the connecting seat. Such arrangement improves the stability of the mechanism, reduces the wear of the parts, and can also reduce the requirements for the machining accuracy of the parts and then reduce the manufacturing costs. Such structure is also easy to assemble, and the requirements for the technical level of assemblers are reduced.

In some embodiments, the groove may be a U-shaped groove. The design of the U-shaped groove may facilitate assembly of the connecting rod and the connecting seat.

In some embodiments, the connecting seat may have a step portion, the step portion includes a first surface and a second surface perpendicular to each other, and the movable component is seated on the first surface and fixedly connected to the movable component through a fastener arranged on the second surface. This may ensure that the connecting seat may be more reliably fixed on the movable component.

In some embodiments, the movable component has at least one tapered wedge, the tapered wedge has an inclined surface, and the inclined surface is configured to exert a force on the lifting component when the movable component moves, so that the lifting component moves in the second direction. The tapered wedge will not fall even under the condition of bearing a large force, so that the stability of lifting can be improved and skewing in the lifting can be avoided.

In some embodiments, the lifting apparatus may include at least two movable components, and the at least two movable components are connected through a connection rod. In this way, the force can be exerted on the lifting component relatively uniformly, stress concentration can be avoided, and the lifting can be more stable.

In some embodiments, one of a sliding rail and a slider may be arranged on the movable component and the other of the sliding rail and the slider may be arranged on a frame of the lifting apparatus, and the sliding rail and the slider cooperate with each other so that the movable component is able to move in the first direction. In this way, the movable component can move stably and smoothly in the first direction, so that the stability of lifting can be further improved.

In some embodiments, a lifting surface of the lifting component for lifting the object may be provided with a plurality of fixing seats, and each fixing seat is provided with a plurality of universal balls. With the arrangement of the universal balls, the lifted object can be conveniently adjusted and positioned. With the arrangement of the plurality of fixing seats, modular manufacturing is facilitated, thereby increasing flexibility and reducing costs. The plurality of universal balls is also beneficial to increasing contact area and better bearing a load.

In some embodiments, the plurality of fixing seats may include a plurality of first fixing seats, wherein the universal balls on the first fixing seats may be arranged in straight lines. This can well support and adjust the lifted object, and can increase the contact area and improve a carrying capacity.

In some embodiments, the plurality of fixing seats may include a plurality of second fixing seats, wherein the universal balls on the plurality of second fixing seats may be arranged in triangles. This can well increase the contact surface and disperse pressure better.

In some embodiments, the triangular arrangements of the universal balls on the plurality of second fixing seats may have at least two different orientations. This can further increase the contact area, disperse the pressure and improve the carrying capacity.

In some embodiments, the lifting apparatus may further include a second actuator and a clamping mechanism, and the second actuator is configured to drive the clamping mechanism to move between a clamping position and a releasing position. In this way, an object or a loading vehicle to be lifted may be preliminarily positioned before being lifted, thereby preventing position deviation.

In some embodiments, the lifting apparatus may further include a positioning mechanism, the positioning mechanism is fixed on the lifting component, the positioning mechanism may include a third actuator and a positioning pin, and the third actuator may be configured to be able to drive the positioning pin to move between an extension position and a retraction position along the second direction. With the arrangement of the positioning mechanism, the lifted object can be more accurately positioned with respect to the lifting apparatus.

In some embodiments, the positioning pin may be configured to fit a positioning hole, and an outer profile of a cross section of at least one of the positioning pins may include a contact section and a non-contact section. The contact section is in contact fit with an inner surface of the positioning hole, and the non-contact section is not in contact with the inner surface of the positioning hole. Such arrangement can prevent over-positioning, and facilitates activities, installation and debugging while being accurate in positioning.

In some embodiments, the positioning pin may be configured to fit a circular positioning hole. The contact section may include two opposite circular arcs, the non-contact section may include four straight line segments respectively connected to four endpoints of the two circular arcs, and the adjacent straight line segments are connected to each other. Lengths of the four straight line segments may be equal to each other. The positioning pin constructed in this way is convenient for processing, and at the same time can prevent over-positioning, and facilitates activities, installation and debugging while being accurate in positioning.

In some embodiments, the positioning mechanism may further include a sliding groove, and the positioning pin is able to move in the sliding groove. The sliding groove can limit a range of activity of the positioning pin.

In some embodiments, the third actuator may include a third actuating rod, and the third actuating rod may be coupled with the positioning pin through a coupler. The positioning mechanism is fixed to the lifting component through a fixing plate. The coupling can reduce the requirements for the machining accuracy of the parts and facilitate assembly and disassembly. The positioning mechanism is fixed to the lifting component through the fixing plate, which is beneficial to realizing accurate positioning after the lifting component is lifted into place.

In some embodiments, the lifting apparatus may include a first detection device, and the first detection device may be configured to detect whether the object to be lifted has been loaded. Whether the object to be lifted has been loaded can be determined by detecting the existence or absence of the object, so that invalid lifting can be avoided.

In some embodiments, the lifting apparatus may include a second detection device, and the second detection device may be configured to detect whether the object to be lifted is deflected. The second detection device may prevent the object from being lifted when the object is loaded abnormally, thereby further improving the stability of lifting.

In some embodiments, the first detection device and/or the second detection device may include an optical detector. The optical detector may include a through-beam detector. By using an optical sensor such as a through-beam sensor, detection can be accurately performed in a simple and low-cost manner.

In some embodiments, the first detection device may be arranged in the middle of at least one side of the object to be lifted. This may detect whether objects of various sizes have been loaded.

In some embodiments, the second detection device may be arranged near at least one corner of four corners of the object to be lifted. This can better detect whether the object to be lifted is deflected in a vertical direction.

In some embodiments, the lifting component may include a cross beam. Rollers are arranged at the bottom of the cross beam, and the rollers are configured to be able to move on the inclined surface when the movable component moves, so that the cross beam moves in the second direction. With the arrangement of the rollers as described above, thrust required by the first actuator can be reduced and the lifting can be smoothly completed.

In some embodiments, the lifting apparatus may further have a guide mechanism, and the guide mechanism is configured to guide an object into the lifting apparatus. The guide mechanism can prevent the object entering the lifting apparatus (such as a loading vehicle) from walking askew.

In some embodiments, the first actuator may further have at least one position detection sensor, and the position detection sensor is configured to detect whether the motion of the first actuating rod in the first direction reaches a predetermined position. With the arrangement of the position sensor, lifting of the lifting apparatus can be more accurately controlled, and the occurrence of situations such as over-lifting or under-lifting can be avoided.

In some embodiments, the first actuator, the second actuator and/or the third actuator are cylinders. The cylinder can provide driving force stably. In the case that the first actuator is the cylinder, since the second direction as a lifting direction is different from the first direction as an extension and retraction direction of the cylinder, even if air supply of the cylinder is insufficient during a pressurized process, the first actuating rod of the cylinder is also difficult to be pushed to extend and retract by downward pressure, so that self-locking of the lifting surface can be realized.

In another aspect, some embodiments of the present invention provide a loading vehicle lifting system, the loading vehicle lifting system including a lifting apparatus according to any of the preceding embodiments and a loading vehicle, the loading vehicle including a base plate, and the base plate being configured to be able to be lifted by the lifting apparatus in the second direction. In addition to the advantages brought by the lifting apparatus described above, since the loading vehicle includes the base plate for carrying objects that can be lifted separately, there is no need to lift the loading vehicle, which can improve the lifting capacity and adapt to various lifting requirements.

In some embodiments, the base plate may have at least one positioning hole. The positioning hole can cooperate with the positioning pin of the lifting apparatus, to accurately position the base plate of the loading vehicle with respect to the lifting apparatus.

In some embodiments, the loading vehicle may be an automated guided vehicle. This helps to automate conveying, lifting and other tasks.

In some embodiments, the loading vehicle may be used to load a battery pack. This helps to stable lifting during battery manufacturing, assembly and/or maintenance.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

DESCRIPTION OF DRAWINGS

Various other advantages and benefits will become apparent to those of ordinary skill in the art upon reading the following detailed description of the preferred embodiments. The drawings are for the purpose of illustrating the preferred embodiments only and are not to be considered a limitation to the present application. And the same components are denoted by the same reference numerals throughout the drawings. In the drawings.

Figure 1:
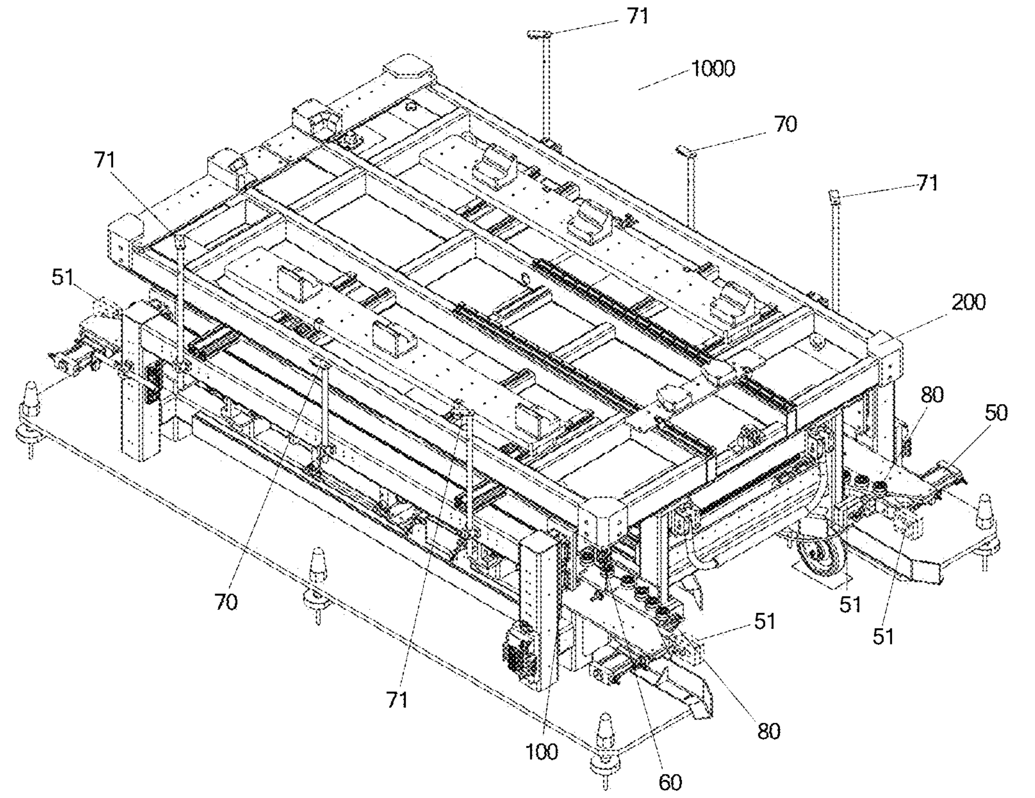
FIG. 1 is a schematic structural diagram of a loading vehicle lifting system according to some embodiments of the present application.

In the drawings, the drawings are not drawn to actual scale.

The reference numerals in Detailed Description are as follows: loading vehicle lifting system 1000; lifting apparatus 100; first actuator 10; first actuating rod 11; position sensor 12; movable component 20; frame 21; inclined surface 22; connection rod 23; sliding rail 24; slider 25; lifting component 30; lifting surface 31; fixing seat 32; first fixing seat 321; second fixing seat 322; universal ball 33; cross beam 34; roller 35; first connecting mechanism 40; connecting rod 41; first position-limiting part 411; second position-limiting part 412; third part 413; connecting seat 42; groove 421; step portion 422; first surface 4221; second surface 4222; nut 43; fastener 44; second actuator 50; clamping mechanism 51; positioning mechanism 60; third actuator 61; third actuating rod 611; positioning pin 62; contact section 621; non-contact section 622; sliding groove 63; coupling 64; fixing plate 65; first detection device 70; second detection device 71; guide mechanism 80; loading vehicle 200; base plate 201; positioning hole 202.

DETAILED DESCRIPTION

Examples of the technical solutions of the present application will be described in detail below in conjunction with the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific examples and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that there may be three relationships, for example A and/or B may represent three situations: A exists alone, both A and B exist, and B exists alone. In addition, the character "/" herein generally means that front and rear associated objects are in an "or" relationship.

In the description of the embodiments of the present application, the term "a plurality of" refers to two or more (including two).

In the description of the embodiments of the present application, the orientation or position relationship indicated by the technical terms "length", "upper", "lower", "front", "back", "left", "right", "upright", "vertical", "horizontal", "top", "bottom", "inner", "outer", "axial", etc. are based on the orientation or position relationship shown in the drawings and are intended to facilitate the description of the embodiments of the present application and simplify the description only, rather than indicating or implying that the apparatus or element referred to must have a particular orientation or be constructed and operated in a particular orientation, and therefore are not to be interpreted as limitations on the embodiments of the present application.

In the description of the embodiments of the present application, unless otherwise expressly specified and limited, the technical terms "install", "join", "connect", "fix", "couple", etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the embodiments of the present application can be understood according to specific situations.

While the present application has been described with reference to some embodiments, various modifications may be made and components therein may be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

Lifting apparatuses have been widely used in various occasions of industrial production and daily life. The current lifting apparatuses have the problem of low stability. Especially when the weight of a lifted object is large, a lifting surface of the lifting apparatus is easy to fall under the action of pressure, thereby causing the lifted object to be skewed and inaccurately positioned.

In order to improve the stability of the lifting apparatus, an embodiment of the present application provides a lifting apparatus, wherein the lifting apparatus includes an actuator and a lifting component, and the actuator is used as a driving source for lifting motion, and the lifting component is used to lift the object to be lifted in a lifting direction. The actuator is configured such that a moving direction of an actuating rod thereof is different from the lifting direction of the lifting component.

Since the moving direction of the actuating rod of the actuator is different from the lifting direction, even if the lifting apparatus bears a large load, the actuating rod of the actuator is difficult to be pushed by downward pressure, thereby realizing self-locking of the lifting surface, so that the stability of the lifting apparatus is improved and the lifted object can be prevented from being skewed and inaccurately positioned.

For this purpose, the lifting apparatus according to the embodiment of the present application may include a movable component. The movable component is connected with the actuating rod and can move with motion of the first actuating rod. The movable component is configured to exert a force on the lifting component while moving, so that the lifting component moves in the lifting direction that is different from the moving direction of the actuating rod.

The lifting apparatus according to the embodiment of the present application can be used to lift any object to be lifted from a lower position to a higher position, and return the object from the higher position to the lower position. The object may be, for example, a battery pack, a vehicle or parts thereof, or any other components that need to be lifted.

For the convenience of description, the following embodiments are illustrated by taking the loading vehicle lifting system 1000 according to an embodiment of the present application as an example.

Figure 2:
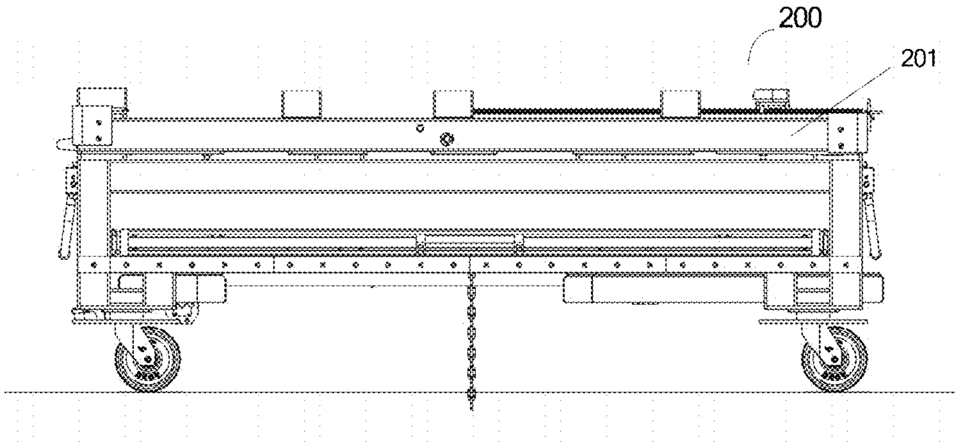
FIG. 2 is a lateral schematic diagram of a loading vehicle according to some embodiments of the present application.
Figure 3:
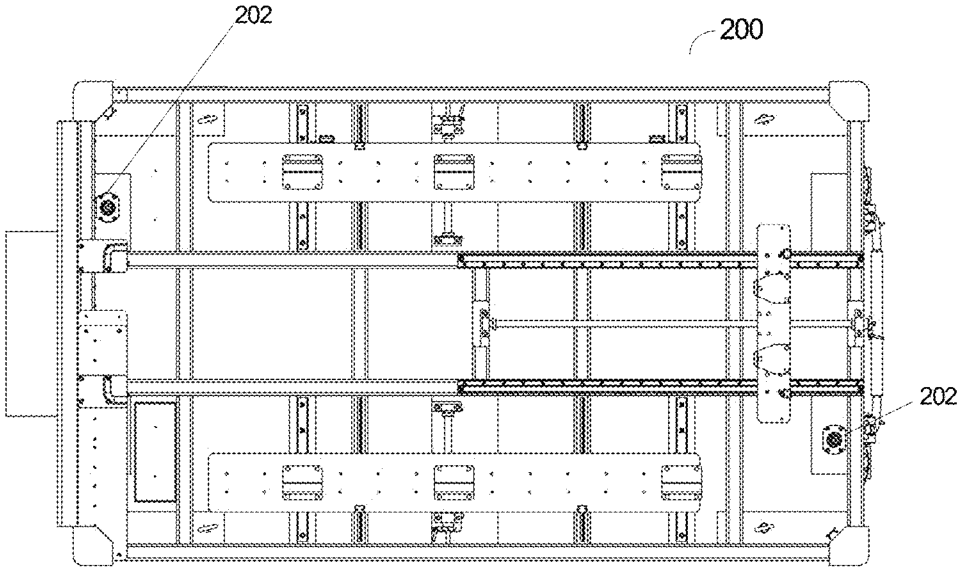
FIG. 3 is a top-view schematic diagram of a loading vehicle according to some embodiments of the present application.

Please refer to FIG. 1 to FIG. 3. FIG. 1 is a schematic structural diagram of a loading vehicle lifting system 1000 according to an embodiment of the present application. FIG. 2 and FIG. 3 respectively show a lateral schematic diagram and a top-view schematic diagram of an embodiment of a loading vehicle 200. The loading vehicle lifting system 1000 includes a lifting apparatus 100 and a loading vehicle 200. The lifting apparatus 100 is an apparatus for raising an object to be lifted. The loading vehicle 200 is a transport machine for loading the object to be lifted. Although FIG. 1 and FIG. 3 show that the loading vehicle may have wheels, the loading vehicle may alternatively have no wheels. The loading vehicle 200 may be a feeding vehicle, an automated guided vehicle (AGV) or any other transport machines capable of carrying objects.

The loading vehicle 200 may have a base plate 201. The object to be lifted may be loaded on the base plate 201. The base plate 201 can be raised and lowered separately. In other words, when the loading vehicle 200 is in place in the lifting apparatus 100, the lifting apparatus 100 can only lift the base plate 201 and keep the loading vehicle stationary. This can reduce a lifting load and facilitates lifting and positioning. Alternatively, the lifting apparatus 100 may also directly lift the object to be lifted or lift the loading vehicle 200.

Figure 4:
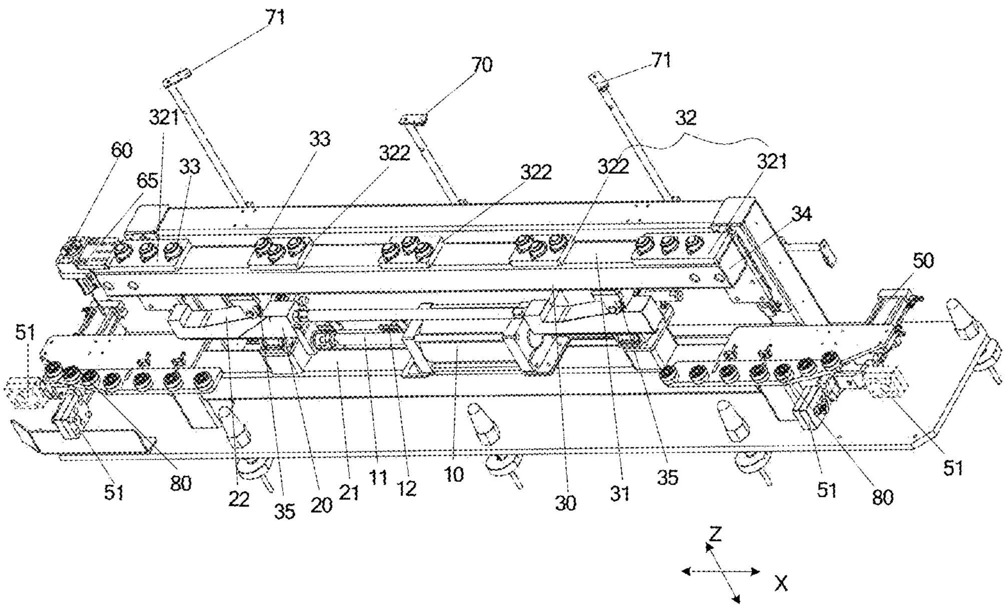
FIG. 4 is a schematic structural diagram of a lifting apparatus according to some embodiments of the present application.
Figure 5A:
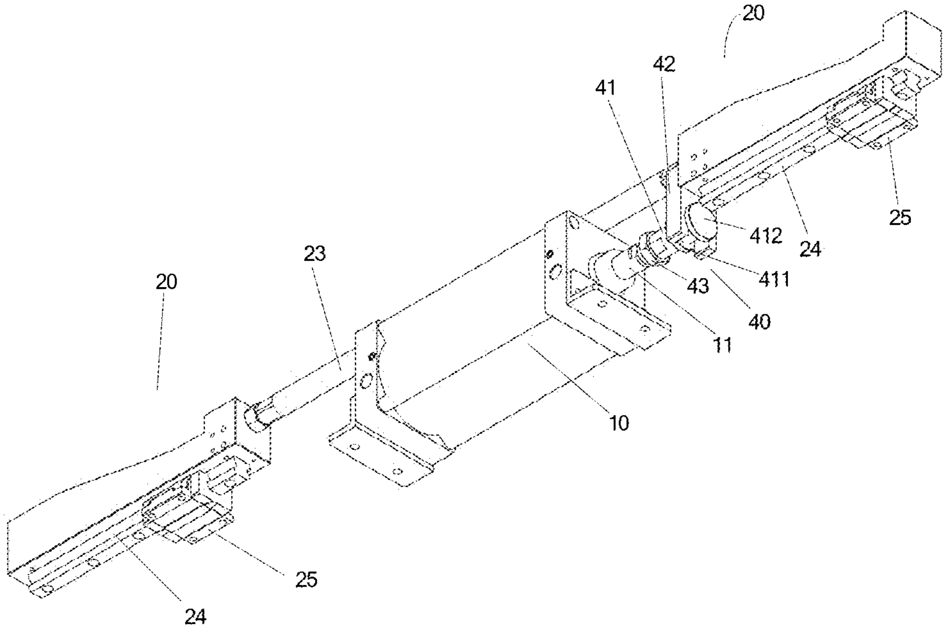
FIG. 5A is a schematic perspective view of a part of a lifting apparatus viewed from a bottom surface according to some embodiments of the present application.
Figure 5B:
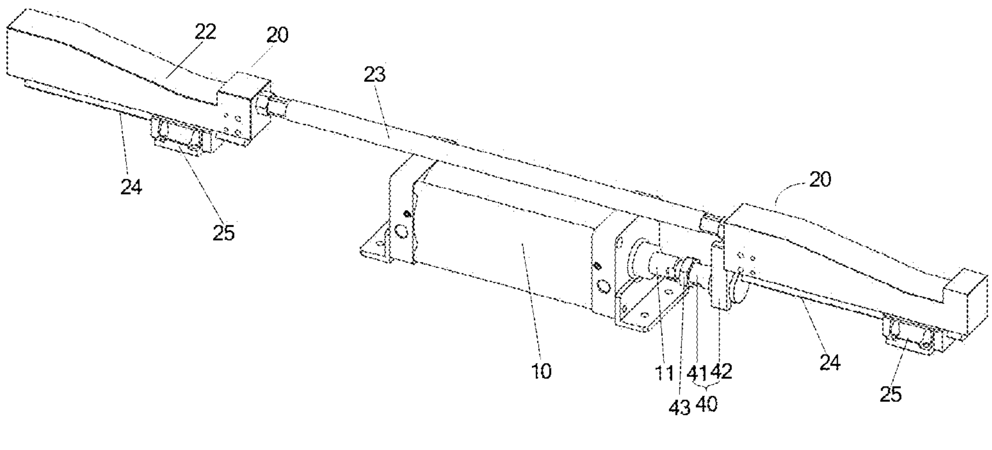
FIG. 5B is a schematic perspective view of a part of a lifting apparatus viewed from a side surface according to some embodiments of the present application.

The lifting apparatus 100 according to some embodiments of the present application will be described below with reference to FIG. 1 and FIG. 4 to FIG. 6. FIG. 4 is a schematic structural diagram of a lifting apparatus according to some embodiments of the present application. FIG. 5A and FIG. 5B are schematic structural diagrams of a part of the lifting apparatus viewed from a bottom surface and a side surface respectively according to some embodiments of the present application. The lifting apparatus 100 may include a first actuator 10, a movable component 20 and a lifting component 30. The first actuator 10 includes a first actuating rod 11. The first actuating rod 11 is configured to be able to move in a first direction. The movable component 20 is connected with the first actuating rod 11 and is configured to be able to move with the motion of the first actuating rod 11. The lifting component 30 is configured to lift the object to be lifted. The lifting component is configured to be able to receive a force exerted by the movable component to move in a second direction. The second direction is different from the first direction. FIG. 4 shows the first direction X as an example and the second direction Z as an example.

The first actuator 10 is a driving source of the lifting motion. The first actuator may be any device capable of driving the movable component to move. In some embodiments, the first actuator may be a driving source that outputs linear motion. In some embodiments, the first actuator 10 may be a cylinder. Alternatively, the first actuator 10 may also be a hydraulic cylinder, a motor and other types of power driving sources. The first actuating rod 11 is a power output component of the first actuator. To be able to move in the first direction may be to be able to reciprocate in a first linear direction. In some embodiments, the first direction may be a length direction of the first actuating rod 11, such as the direction along a straight line X in FIG. 4. Motion in the second direction may be to reciprocate in a second linear direction. The second direction is a direction along which the lifting component 30 lifts the object and retracts the object, such as the direction along a straight line Z in FIG. 4. The second direction being different from the first direction refers to that the first direction and the second direction cross each other. In some examples, the first direction may be perpendicular to the second direction. In some examples, the first direction may be a horizontal direction, and the second direction may be a vertical direction.

According to the lifting apparatus of the embodiment of the present application, since the moving direction of the first actuating rod 11 of the first actuator 10 may be different from the lifting direction of the lifting component 30, even if the lifting component 30 bears excessive pressure, it is not easy to cause the first actuating rod 11 of the first actuator 10 to move under pressure, thereby realizing self-locking in lifting, preventing the lifted object from being shifted and skewed, and improving the stability of lifting and the accuracy of positioning.

The movable component 20, as a motion transmission component, may convert the motion of the first actuating rod 11 of the first actuator 10 in the first direction into the motion of the lifting component 30 in the second direction. The movable component 20 may be any motion transmission component capable of moving with the motion of the first actuating rod 11 and capable of exerting a force having a component in the second direction on the lifting component 30 while moving. For example, such motion transmission component may include, but is not limited to, one or more of a transmission rod, a slider, a cam, a ratchet, and a gear.

In some embodiments, the movable component is configured to be able to move in the first direction with the motion of the first actuating rod 11. The movable component 20 may have an inclined surface 22. The inclined surface 22 is configured to exert a force on the lifting component when the movable component moves, so that the lifting component moves in the second direction.

In some embodiments, "the movable component 20 has an inclined surface" may refer to that at least a part of a surface of the movable component interacting with the lifting component 30 is inclined with respect to the first direction. In other words, at least a part of the surface of the movable component interacting with the lifting component 30 is not parallel to the first direction.

Since the movable component 20 has the inclined surface 22, when the movable component 20 moves, the inclined surface may exert a force on the lifting component 30. The force may have a component in the second direction, so that the lifting component 30 can move in the second direction. In this way, self-locking in lifting can be achieved with a simple structure, thereby improving the stability of lifting and the accuracy of positioning.

In some embodiments, an inclination angle of the inclined surface 22 with respect to the first direction may be 10 degrees to 45 degrees. In some embodiments, the inclination angle of the inclined surface 22 with respect to the first direction may be 15 degrees to 30 degrees. In some embodiments, the inclination angle of the inclined surface 22 with respect to the first direction may be 20 degrees to 25 degrees. The inclination angle of the inclined surface 22 with respect to the first direction may be 12 degrees, 17 degrees, 22 degrees, 27 degrees, 35 degrees or 40 degrees.

By properly selecting the inclination angle, the first actuating rod 11 of the first actuator 10 can be better prevented from moving under pressure, thereby better improving the stability of lifting and the accuracy of positioning.

Further refer to FIG. 5A and FIG. 5B. In some embodiments, the first actuating rod 11 may be connected to the movable component 20 through a first connecting mechanism 40. The first connecting mechanism 40 may be configured such that the motion of the first actuating rod 11 is transmitted to the movable component 20, and the first connecting mechanism 40 is configured such that there is a motion margin in the first direction between the first actuating rod 11 and the movable component 20.

The existence of the motion margin between the first actuating rod 11 and the movable component 20 in the first direction refers to that the first actuating rod 11 and the movable component 20 are not completely rigidly connected in the first direction, but may have a small relative displacement therebetween. The motion margin may be, for example, 0.5 mm to 1.5 mm, and may be 0.6 mm, 0.8 mm, 1.0 mm, 1.2 mm or 1.4 mm. Certainly, in the case that the size of the component is increased, the motion margin can also be set larger.

Since the first actuating rod 11 is connected with the movable component 20 through the first connecting mechanism 40 by the way of having the certain motion margin, the requirements for the machining accuracy of parts is reduced, and the manufacturing costs are reduced.

Figure 7A:
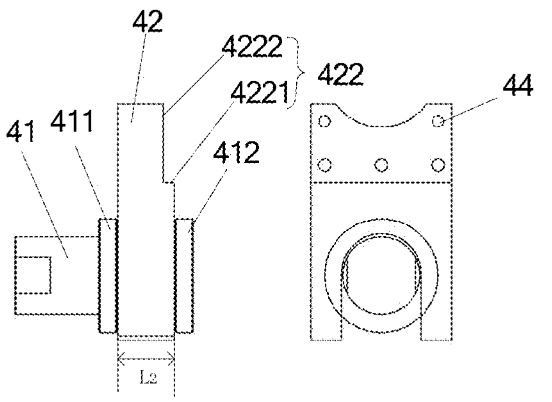
FIG. 7A is lateral and front-view schematic diagrams of a connecting rod and a connecting seat assembled together of a first connecting mechanism according to some embodiments of the present application.
Figure 7B:
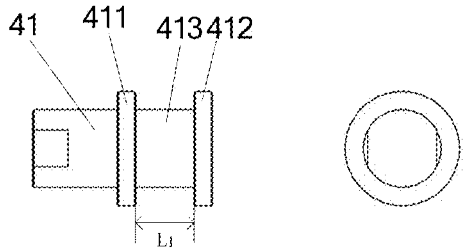
FIG. 7B is lateral and front-view schematic diagrams of a connecting rod of a first connecting mechanism according to some embodiments of the present application.
Figure 7C:
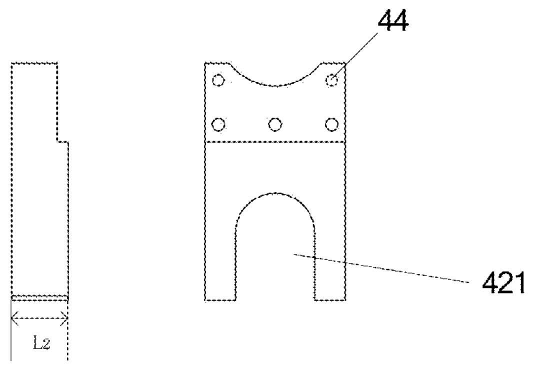
FIG. 7C is lateral and front-view schematic diagrams of a connecting seat of a first connecting mechanism according to some embodiments of the present application.

Further reference is made to FIG. 7A to FIG. 7C while referring to FIG. 5A and FIG. 5B. FIG. 7A is lateral and front-view schematic diagrams of a connecting rod and a connecting seat assembled together of a first connecting mechanism according to some embodiments of the present application. FIG. 7B is lateral and front-view schematic diagrams of a connecting rod of a first connecting mechanism according to some embodiments of the present application. FIG. 7C is lateral and front-view schematic diagrams of a connecting seat of a first connecting mechanism according to some embodiments of the present application. In some embodiments, the first connecting mechanism 40 may include a connecting rod 41 and a connecting seat 42. The connecting rod 41 may be connected with the first actuating rod 11 (for example through a nut 43 shown in FIG. 5A and FIG. 5B). The connecting seat 42 may be connected with the movable component 20. With the respective arrangement of the connecting rod 41 and the connecting seat 42, wear on the main parts can be reduced and assembly can be facilitated.

In some embodiments, the connecting rod 41 may have with a first position-limiting part 411, a second position-limiting part 412, and a third part located 413 between the first position-limiting part 411 and the second position-limiting part 412. The first position-limiting part 411 and the second position-limiting part may be limiting parts with increased diameters. The connecting seat may have a groove 421. The first position-limiting part 411 and the second position-limiting part 412 are located outside the groove 421 on opposite sides respectively and are configured to limit motion of the connecting rod 41 in the first direction. The third part 413 is accommodated in the groove 421. With such a structure, the stability of the mechanism can be improved and assembly can be facilitated.

In some embodiments, the groove 421 has a length L2 in the first direction (referring to FIG. 7A and FIG. 7C). A length L1 of the third part 413 (referring to FIG. 7B) may be slightly greater than the length L2 of the groove 421, so that the connecting rod 41 has the motion margin in the first direction with respect to the connecting seat 42.

The limiting part with the increased diameter refers to that the diameter of the limiting part is greater than that of other parts of the connecting rod 41. "A length L1 of the third part 413 may be slightly greater than the length L2 of the groove 421, so that the connecting rod 41 has the motion margin in the first direction with respect to the connecting seat 42" means that there may be a small relative displacement between the connecting rod 41 and the connecting seat 42 in the first direction. Similar to the above, the clearance may be 0.5 mm to 1.5 mm, and may be 0.6 mm, 0.8 mm, 1.0 mm, 1.2 mm or 1.4 mm. In the case that the size of the component is increased, the clearance can be set larger.

Through the connecting rod 41 and the connecting seat 42 as described above, the stability of the mechanism can be improved and the wear on the parts can be reduced. In addition, the requirements for the machining accuracy of the parts can be reduced, and the manufacturing costs can be reduced. In addition, such a structure is easy to assemble, and the requirements for the technical level of assemblers are reduced.

In some embodiments, as shown in FIG. 7A and FIG. 7C, the groove 421 is a U-shaped groove. As shown in FIG. 5A, the design of the U-shaped groove may facilitate the assembly of the connecting rod 41 and the connecting seat 42.

In some embodiments, as shown in FIG. 7A, the connecting seat 42 may have a step portion 422. The step portion 422 may include a first surface 4221 and a second surface 4222 perpendicular to each other, and the movable component 20 is seated on the first surface 4221 and fixedly connected to the movable component 20 through a fastener 44 arranged on the second surface 4222. The fastener 44 may be a bolt or similar component.

The extension direction of the first surface 4221 may be configured to be the same as the extension direction of a bottom surface of the movable component 30, so that the bottom surface of the movable component 20 may be seated on the first surface. In some embodiments, the extension direction of the first surface 4221 may be the same as the first direction. For example, the first surface may be arranged along a horizontal direction. The second surface 4222 may be perpendicular to the first surface 4221, for example, may be arranged along a vertical direction.

The step portion 422 as described above ensure that the connecting seat 42 may be more reliably fixed on the movable component 20.

Figure 6:
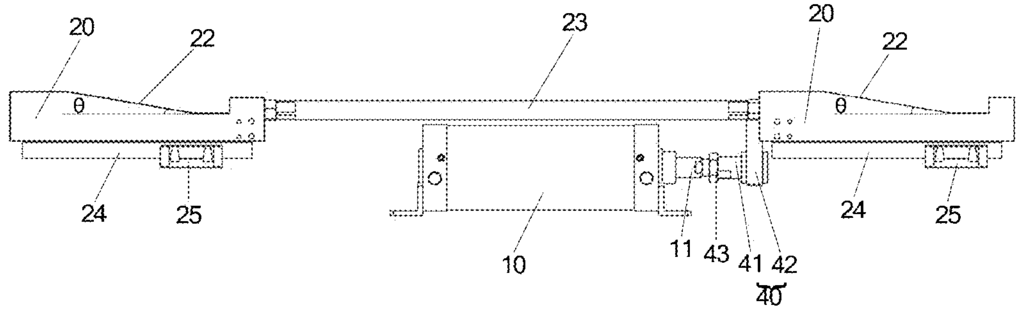
FIG. 6 is a lateral schematic diagram of a part of a lifting apparatus according to some embodiments of the present application.

In some embodiments, as shown in FIG. 4 to FIG. 6, the movable component 20 includes at least one tapered wedge, the tapered wedge has an inclined surface 22, and the inclined surface 22 is configured to exert a force on the lifting component 30 when the movable component 20 moves, so that the lifting component 30 moves in the second direction.

The tapered wedge may be a slider with an inclined surface. In some embodiments, "the tapered wedge has an inclined surface 22" may refer to that at least a part of a surface of the tapered wedge interacting with the lifting component 30 is inclined with respect to a surface (such as a lower surface) opposite to this surface, or inclined with respect to a direction (for example, the first direction) along which the tapered wedge moves. In other words, at least a part of the surface (for example, an upper surface) of the tapered wedge interacting with the lifting component 30 is not parallel to the surface (for example, the lower surface) opposite to this surface, or not parallel to the direction (for example, the first direction) along which the tapered wedge moves. "The tapered wedge has an inclined surface 22" does not exclude that the surface of the tapered wedge interacting with the lifting component 30 may have a non-inclined surface. In some embodiments, the non-inclined surface is connected to the inclined surface, and the connected part serves as a starting point and/or end point for the formation of lifting.

The tapered wedge, as the movable component, is used to convert the motion of the first actuating rod 11 in the first direction into the motion of the lifting component 30 in the second direction. The tapered wedge will not fall under the condition of bearing a larger force, so that the stability of lifting can be improved and skewing in the lifting can be avoided.

As mentioned above, for the tapered wedge, in some embodiments, as shown in FIG. 6, an inclination angle θ of the inclined surface 22 with respect to the first direction may be 10 degrees to 45 degrees. In some embodiments, an inclination angle θ of the inclined surface 22 with respect to the first direction may be 15 degrees to 30 degrees. In some embodiments, an inclination angle θ of the inclined surface 22 with respect to the first direction may be 20 degrees to 25 degrees. The inclination angle θ of the inclined surface 22 with respect to the first direction may be 12 degrees, 17 degrees, 22 degrees, 27 degrees, 35 degrees or 40 degrees.

In some embodiments, the lifting apparatus 100 includes at least two movable components 20, and the at least two movable components 20 are connected through a connection rod 23. In the embodiments shown in FIG. 5A and FIG. 5B, the lifting apparatus 100 includes two movable components 20. One of the movable components 20 is connected with the first actuating rod 11 of the first actuator 10. The two movable components 20 are connected through a connecting rod 23.

The movable components 20 are connected through the connecting rod 23, so that they can move integrally. With the arrangement of the plurality of movable components, a force can be relatively uniformly exerted on the lifting component 30, which avoids stress concentration, and makes the lifting more stable.

In some embodiments, one of a sliding rail 24 and a slider 25 is arranged on the movable component 20 and the other one of the sliding rail 24 and the slider 25 is arranged on a frame 21 of the lifting apparatus 100, and the sliding rail 24 and the slider 25 cooperate with each other so that the movable component 20 can move in the first direction.

In the embodiments shown in FIG. 4 to FIG. 6, a sliding rail 24 is arranged on the movable component 20. The sliding rail 24 may be integrally connected with the movable component 20. A slider 25 is arranged on the frame 21 of the lifting apparatus 100. The slider 25 is fixed on the frame 21. The movable component 20 moves in the first direction (the direction X in FIG. 4) through the motion of the sliding rail 24 on the slider 25.

With the arrangement of the sliding rail and the slider, the movable component 20 can move stably and smoothly in the first direction, so that the lifting stability can be further improved. In addition, the arrangement of the sliding rail on the movable component 20 is especially beneficial for the case that the movable component has a long stroke due to the capability of reducing space occupation.

In some embodiments, as shown in FIG. 4, a lifting surface 31 of the lifting component 30 for lifting an object may be provided with a plurality of fixing seats 32. Each fixing seat is provided with a plurality of universal balls 33. In some embodiments, the plurality of fixing seats 32 may be arranged at equal intervals on the lifting component 30.

The universal ball is a sphere that can roll in all directions around a center of the sphere. Therefore, the lifted object can move on a surface formed by the universal balls, so that the lifted object can be conveniently adjusted and positioned. The plurality of fixing seats are arranged and the plurality of universal balls are arranged on each fixing seat, so that modular configuration and adjustment of the universal balls are facilitated, thereby increasing flexibility and reducing costs. In addition, the arrangement of the plurality of universal balls is also beneficial to increasing contact area and better bearing a load. The plurality of fixing seats 32 arranged at equal intervals can achieve a better pressure dispersion effect with fewer universal balls.

In some embodiments, the plurality of fixing seats 32 may include first fixing seats 321, wherein the universal balls 33 on the first fixing seats 321 are arranged in straight lines, as shown in FIG. 4. In some embodiments, the straight lines may extend along the length direction of the lifting component.

The universal balls arranged in the straight lines can well support and adjust the lifted object, and can increase the contact area and improve a carrying capacity.

In some embodiments, additionally or alternatively, as shown in FIG. 4, the plurality of fixing seats 32 may include a plurality of second fixing seats 322. The universal balls 33 on the plurality of second fixing seats 322 are arranged in triangles.

The universal balls 33 arranged in the triangles refer to that the universal balls form vertexes of the triangles. The universal balls arranged in the triangles can better increase the contact area and better disperse pressure.

In some embodiments, as shown in FIG. 4, the triangular arrangements of the universal balls 33 on the plurality of second fixing seats 322 have at least two different orientations.

The triangular arrangements having the same orientation refer to that corresponding sides of the triangles are in the same direction. Correspondingly, the triangular arrangements having the different orientations refer to that the corresponding sides of the triangles are in different directions. In other words, two triangle arrangements having different orientations refer to that the two triangles are rotated by a predetermined angle relative to each other.

The universal balls 33 on the second fixing seats 322 arranged in the triangles with different orientations can further increase the contact area, disperse the pressure and improve the carrying capacity.

In some embodiments, as shown in FIG. 4, a plurality of first fixing seats 321 having linearly arranged universal balls 33 and a plurality of second fixing seats 322 having triangularly arranged universal balls 33 are arranged on a lifting surface 31 of the lifting component 30. In some embodiments, the first fixing seats 321 may be arranged at two end parts of the lifting surface 31 of the lifting component 30. The second fixing seats 322 may be arranged between the first fixing seats 321. In some embodiments, each second fixing seat 322 having the triangularly arranged universal balls 33 may have the same configuration. At the time of arrangement, at least one second fixing seat rotates at a predetermined angle (for example, 180 degrees) relative to the adjacent second fixing seat. This facilitates modular production, so as to better increase the contact area, disperse the pressure and improve the bearing capacity at a lower cost.

In some embodiments, as shown in FIG. 1 and FIG. 4, the lifting apparatus 100 further includes a second actuator 50 and a clamping mechanism 51. The second actuator 50 is configured to drive the clamping mechanism 51 to move between a clamping position (see the clamping mechanism 51 shown by solid lines in FIG. 1 and FIG. 4) and a releasing position (see the clamping mechanism 51 shown by dashed lines in FIG. 1 and FIG. 4).

The clamping mechanism 51 may be any type of clamp. The clamping position is a position where the clamping mechanism 51 clamps the object to be lifted or the loading vehicle carrying the object to restrict the motion of the loading vehicle. The releasing position is a position where the clamping mechanism 51 no longer clamps the object to be lifted or the loading vehicle carrying the object. In some embodiments, as shown in FIG. 1, in the clamping position, the clamping mechanism 51 can clamp the loading vehicle 200 at two ends of the loading vehicle 200 in the first direction (a driving direction of the loading vehicle or the direction X in FIG. 4), to limit the motion of the loading vehicle in the first direction. With the arrangement of the clamping mechanism 51, the object or the loading vehicle to be lifted may be preliminarily positioned before being lifted.

Further refer to FIG. 4 and FIG. 8 to FIG. 10 below. In some embodiments, the lifting apparatus 100 further includes a positioning mechanism 60. The positioning mechanism 60 may be fixed on the lifting component 30. The positioning mechanism 60 includes a third actuator 61 and a positioning pin 62. The third actuator 61 is configured to be able to drive the positioning pin 62 to move between an extension position and a retraction position along the second direction.

The positioning mechanism 60 is an apparatus used to position the lifted object on a lifting plane (a plane perpendicular to the second direction). The extension position is such a position where the positioning pin 62 extends in the second direction so that the positioning pin 62 can be inserted into and fit a positioning hole 202 in the lifted object. The retraction position is a position where the positioning pin 62 is retracted in the second direction so that the positioning pin 62 exits from the positioning hole 202. The lifted object may be, for example, the base plate 201 of the loading vehicle 200, the loading vehicle 200 and/or the object loaded on the base plate 201 of the loading vehicle 200.

With the arrangement of the positioning mechanism 60, the lifted object may be more accurately positioned with respect to the lifting apparatus 100.

Figure 11:
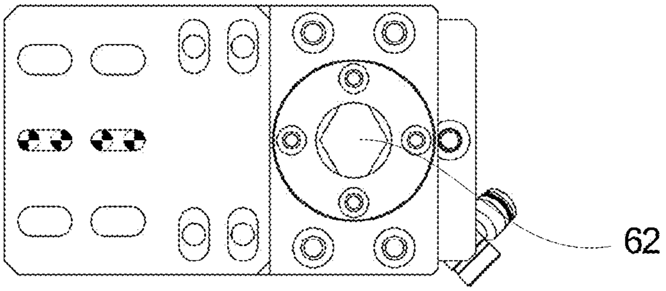
FIG. 11 is a top-view schematic diagram of a positioning mechanism of a lifting apparatus according to some embodiments of the present application.
Figure 12:
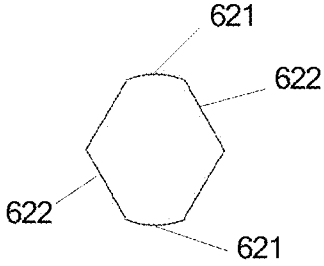
FIG. 12 is an enlarged view of a cross section of a positioning pin of a positioning mechanism according to some embodiments of the present application.

In some embodiments, the positioning pin 62 is configured to fit the positioning hole 202. Referring to FIG. 11 and FIG. 12, FIG. 11 is a top-view schematic diagram of a positioning mechanism of a lifting apparatus according to some embodiments of the present application. FIG. 12 is an enlarged view of a cross section of a positioning pin of a positioning mechanism according to some embodiments of the present application. As shown in FIG. 12, an outer profile of a cross section of at least one of the positioning pins 62 has a contact section 621 and a non-contact section 622. The contact section 621 is in contact fit with an inner surface of the positioning hole 202, and the non-contact section 622 is not in contact with the inner surface of the positioning hole.

The outer profile of the cross section of the positioning pin as mentioned above can reduce a degree of positioning freedom, prevent over-positioning, and facilitates activities, installation and debugging while being accurate in positioning.

In some embodiments, the positioning pin 62 is configured to fit the positioning hole 202 that is circular. As shown in FIG. 12, the contact section 621 includes two opposite circular arcs. The non-contact section 622 includes four straight line segments connected to four endpoints of the two circular arcs respectively, and the adjacent straight line segments are connected to each other. The lengths of the four straight line segments may be equal to each other. Therefore, the positioning pin having a rhombus-like cross section can be formed. The rhombus-like shape may be regarded as a rhombus in which two opposite corners are replaced by circular arcs suitable for contact fit with the inner surface of the circular positioning hole.

The positioning pin constructed in this way is convenient for processing, and at the same time can prevent over-positioning, and facilitates activities, installation and debugging while being accurate in positioning.

In some embodiments, the positioning mechanism 60 further includes a sliding groove 63, and the positioning pin 62 can move in the sliding groove 63.

The sliding groove 63 is a channel in which the positioning pin can move. The sliding groove 63 can limit a range of activity of the positioning pin.

Figure 8:
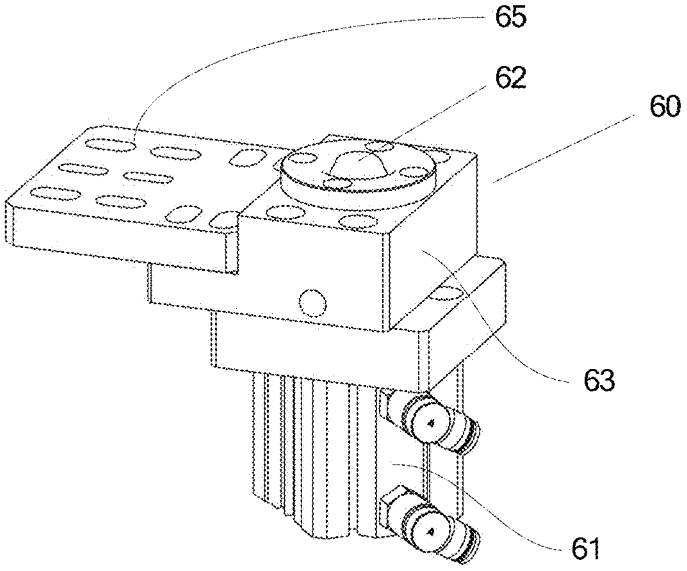
FIG. 8 is a schematic structural diagram of a positioning mechanism of a lifting apparatus according to some embodiments of the present application.
Figure 9:
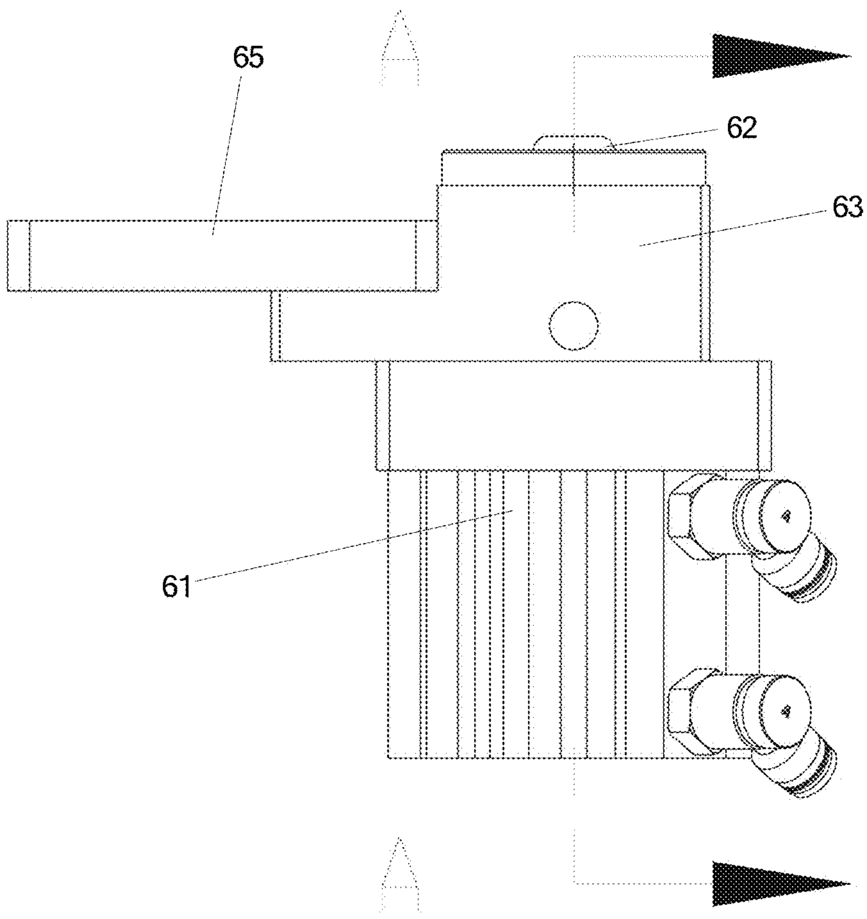
FIG. 9 is a front-view schematic diagram of a positioning mechanism of a lifting apparatus according to some embodiments of the present application.
Figure 10:
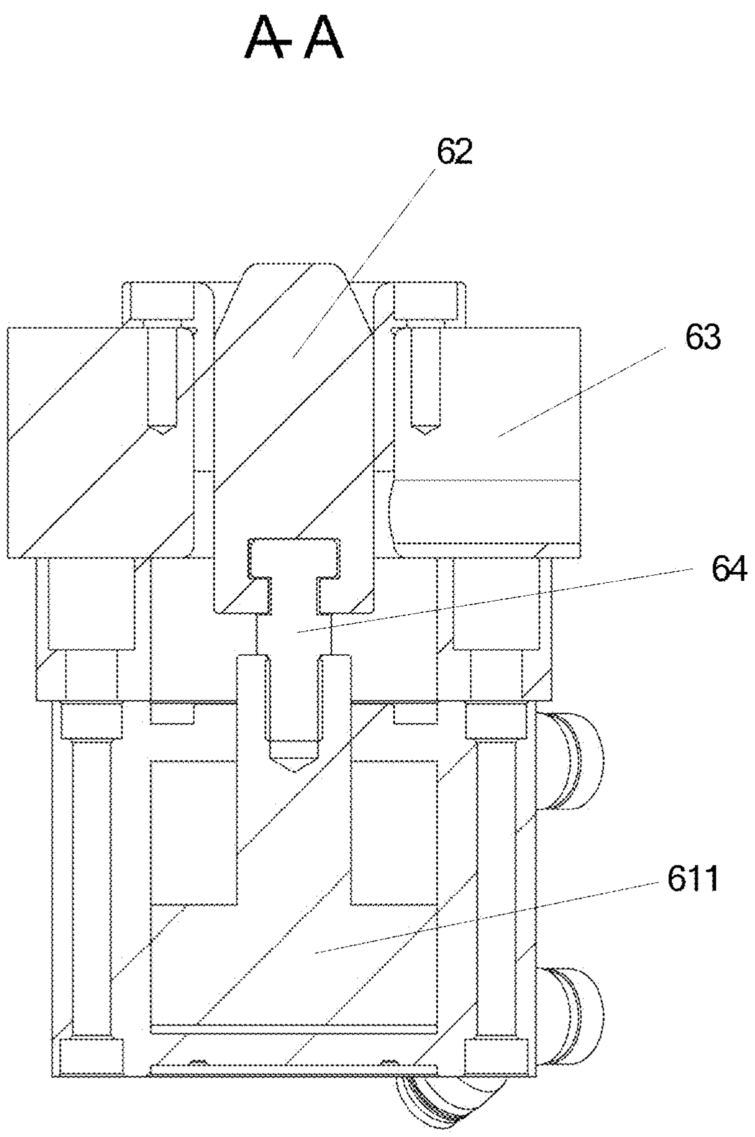
FIG. 10 is an A-A sectional schematic diagram of a positioning mechanism of a lifting apparatus according to some embodiments of the present application.

In an embodiment, referring to FIG. 9 and FIG. 10, the third actuator 61 includes a third actuating rod 611. The third actuating rod 611 can be coupled with the positioning pin 62 through a coupling 64. Referring to FIG. 8 and FIG. 9, the positioning mechanism 60 may be fixed to the lifting component 30 through a fixing plate 65.

Therefore, the third actuating rod 611 can be coupled with the positioning pin 62 through the coupling 64, which can reduce the requirements for the machining accuracy of the parts and facilitate assembly and disassembly. The positioning mechanism is fixed to the lifting component through the fixing plate, which is beneficial to realizing accurate positioning after the lifting component is lifted into place.

A first detection device and a second detection device of the lifting apparatus 100 are described below with reference to FIG. 1 and FIG. 4. In an embodiment, the lifting apparatus 100 includes a first detection device 70, and the first detection device 70 is configured to detect whether an object to be lifted has been loaded.

With the arrangement of the first detection device that is used to detect whether the object to be lifted has been loaded, whether the object to be lifted has been loaded can be determined, so that invalid lifting can be avoided.

The first detection device 70 may be any sensor capable of detecting the existence or absence of an object. As a non-limiting example, the first detection device may include an optical sensor. The optical sensor is a sensor that uses optical principles to detect objects. As a non-limiting example, the optical sensor may include a through-beam sensor. The through-beam sensor is a sensor that can judge the existence or absence of an object by comparing the conditions of emitted and received light. In the case that the light emitted by the optical sensor is blocked by the object to be lifted, the optical sensor can receive a signal to determine the existence of the object to be lifted.

By using the optical sensor such as the through-beam sensor, the existence or absence of the object can be accurately detected in a simple and low-cost manner.

In an embodiment, the lifting apparatus includes a second detection device 71. The second detection device is configured to detect whether the object to be lifted is deflected.

The second detection device 71 may be any sensor capable of detecting whether the object to be lifted is deflected. As a non-limiting example, the first detection device may include an optical sensor. As a non-limiting example, the optical sensor may include a through-beam sensor.

By using the optical sensor such as the through-beam sensor, whether the object is deflected can be accurately detected in a simple and low-cost manner.

In an embodiment, the first detection device 70 is arranged in the middle of at least one side of the object to be lifted.

At least one side of the object to be lifted may be any side or a plurality of sides of the object to be lifted, as long as whether the object to be lifted has been loaded can be sensed from this side. The first detection device 70 is arranged in the middle of the at least one side of the object to be lifted, so that it is possible to detect whether objects of various sizes have been loaded.

In an embodiment, the second detection device 71 is arranged near at least one corner of four corners of the object to be lifted.

With the arrangement of the second detection device 71 adjacent to the at least one corner of the four corners of the object to be lifted, when the height of the corner deviates from a predetermined range, the second detection device 71 (such as an optical sensor) can detect position deviation of the corner, so that it can be accurately determined whether the lifted object is deflected.

In an embodiment, as shown in FIG. 4, the lifting component 30 includes a cross beam 34. Rollers 35 are arranged at the bottom of the cross beam 34. The rollers 35 are configured to be able to move on the inclined surface 22 when the movable component 20 moves, so that the cross beam 34 moves in the second direction.

For this purpose, the cross beam 34 can move in the second direction by cooperating with one of the sliding rail and the slider arranged on the frame of the lifting apparatus through the other one of the sliding rail and the slider arranged on the cross beam 34.

With the arrangement of the rollers 35 as described above, thrust required by the first actuator can be reduced and the lifting can be smoothly completed.

In an embodiment, as shown in FIG. 1 and FIG. 4, the lifting apparatus 100 may further have a guide mechanism 80, and the guide mechanism 80 is configured to guide an object into the lifting apparatus 100.

The guide mechanism may be any mechanism that can be guided into the lifting apparatus, such as a guide roller, a guide wheel, a guide wall, etc. The guide mechanism can prevent the object (such as a loading vehicle) entering the lifting apparatus 100 from walking askew.

In an embodiment, as shown in FIG. 4, the first actuator 10 may have least one position detection sensor 12. The position detection sensor 12 is configured to detect whether the motion of the first actuating rod 11 in the first direction reaches a predetermined position.

The position sensor 12 may be any sensor that can sense the position of the object under sensing and convert a sensing result into an output signal. The position sensor 12 may include, for example, a contact position sensor (such as a travel switch, etc.) or a non-contact position sensor (such as a proximity sensor, etc.). With the arrangement of the position sensor, lifting of the lifting apparatus can be more accurately controlled, and the occurrence of situations such as over-lifting or under-lifting can be avoided.

In some embodiments, the first actuator 10, the second actuator 50 and/or the third actuator 61 are cylinders.

The cylinder can provide driving force stably. In addition, in the case that the first actuator 10 is the cylinder, since the second direction as a lifting direction is different from the first direction as an extension and retraction direction of the cylinder, even if air supply of the cylinder is insufficient during a pressurized process, the first actuating rod of the cylinder is also difficult to be pushed by downward pressure to extend and retract, so that self-locking of the lifting surface can be realized.

On the other hand, as shown in FIG. 1, some embodiments of the present application further provide a loading vehicle lifting system 1000. The loading vehicle lifting system may include the lifting apparatus 100 according to any of the foregoing embodiments and a loading vehicle 200. The loading vehicle 200 includes a base plate 201. The base plate 201 is configured to be able to be lifted by the lifting apparatus 100 in the second direction.

Since the loading vehicle includes the base plate 201 for carrying objects that can be lifted separately, there is no need to lift the loading vehicle, which can improve the lifting capacity and adapt to various lifting requirements.

In some embodiments, as shown in FIG. 3, the base plate 201 has at least one positioning hole 202.

The positioning hole 202 is used to fit the positioning pin 62 on the lifting apparatus 100. The positioning hole can accurately position the base plate 201 of the loading vehicle with respect to the lifting apparatus 100. The positioning hole 201 may be arranged in any number at any position of the base plate 201. In some embodiments, the positioning hole 201 may be arranged adjacent to opposite corners of the base plate. This can achieve a better positioning effect.

In some embodiments, the loading vehicle 200 is an automated guided vehicle (AGV). This helps to automate conveying, lifting and other tasks.

In some embodiments, the loading vehicle 200 is used to load a battery pack. This helps to stable lifting during battery manufacturing, assembly and/or maintenance.

The working principle of the loading vehicle lifting system 1000 according to some embodiments of the present application is as follows. The loading vehicle 200 is brought to a predetermined position in the lifting apparatus 100. After the loading vehicle 200 is in place, the second actuator 50 drives the clamping mechanism 51 to clamp the loading vehicle 200. The first actuating rod 11 of the first actuator 10 of the lifting apparatus 100 moves in the first direction to drive the lifting component 30 to move in the second direction, thereby lifting the base plate 201 of the loading vehicle 200 to be separated from the loading vehicle. After the base plate 201 is lifted in place, the third actuator 61 drives the positioning pin 62 to extend and fit the positioning hole 202 in the base plate 201, thereby positioning the base plate 201. After the required task is completed, the positioning pin 62 is retracted away from the positioning hole 202. After the positioning pin 62 is retracted, the first actuator 10 drives the base plate 201 to reversely move in the second direction and fall onto the loading vehicle 200. The second actuator 50 drives the clamping mechanism 51 to release the loading vehicle 200. The loading vehicle 200 leaves the lifting apparatus 100.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A lifting apparatus, the lifting apparatus comprising:

a first actuator, the first actuator comprising a first actuating rod, the first actuating rod being configured to be movable in a first direction;

a movable component, the movable component being connected with the first actuating rod and configured to be movable with motion of the first actuating rod;

a lifting component, the lifting component being configured to lift an object to be lifted, wherein the lifting component is configured to be able to receive a force exerted by the movable component and move in a second direction motion, and the second direction is different from the first direction; and a first connecting mechanism, wherein the first actuating rod is connected to the movable component through the first connecting mechanism, and the first connecting mechanism is configured such that the motion of the first actuating rod is transmitted to the movable component, and the first connecting mechanism is configured such that there is a motion margin in the first direction between the first actuating rod and the movable component, wherein the first connecting mechanism comprises a connecting rod and a connecting seat, the connecting rod is connected with the first actuating rod, and the connecting seat is connected with the movable component, wherein the connecting rod has a first position-limiting part with an increased diameter, a second position-limiting part with an increased diameter, and a third part located between the first position-limiting part and the second position-limiting part, the connecting seat has a groove, the first position-limiting part and the second position-limiting part are located outside the groove on opposite sides respectively and configured to limit motion of the connecting rod in the first direction, and the third part is accommodated in the groove.

2. The lifting apparatus according to claim 1, wherein the movable component is configured to be movable along the first direction with the motion of the first actuating rod, the movable component has an inclined surface, and the inclined surface is configured to exert a force on the lifting component when the movable component moves, so that the lifting component moves in the second direction.

3. The lifting apparatus according to claim 2, wherein an inclination angle of the inclined surface with respect to the first direction is 10 degrees to 45 degrees.

4. The lifting apparatus according to claim 3, wherein the inclination angle of the inclined surface with respect to the first direction is 15 degrees to 30 degrees.

5. The lifting apparatus according to claim 4, wherein the inclination angle of the inclined surface with respect to the first direction is 20 degrees to 25 degrees.

6. The lifting apparatus according to claim 2, wherein the movable component comprises at least one tapered wedge, the tapered wedge has an inclined surface, and the inclined surface is configured to exert a force on the lifting component when the movable component moves, so that the lifting component moves in the second direction.

7. The lifting apparatus according to claim 1, wherein the groove has a length in the first direction, and the length of the third part is slightly greater than the length of the groove, so that the connecting rod has a motion margin in the first direction with respect to the connecting seat.

8. The lifting apparatus according to claim 1, wherein the groove is a U-shaped groove.

9. The lifting apparatus according to claim 1, wherein the connecting seat has a step portion, the step portion comprises a first surface and a second surface perpendicular to each other, and the movable component is seated on the first surface and fixedly connected to the connecting seat through a fastener arranged on the second surface.

10. The lifting apparatus according to claim 1, wherein the lifting apparatus comprises at least two movable components, and the at least two movable components are connected through a connection rod.

11. The lifting apparatus according to claim 1, wherein one of a sliding rail and a slider is arranged on the movable component and the other of the sliding rail and the slider is arranged on a frame of the lifting apparatus, and the sliding rail and the slider cooperate with each other so that the movable component is able to move in the first direction.

12. The lifting apparatus according to claim 1, wherein a lifting surface of the lifting component for lifting the object is provided with a plurality of fixing seats, and each fixing seat is provided with a plurality of universal balls.

13. The lifting apparatus according to claim 12, wherein the plurality of fixing seats comprise a plurality of first fixing seats, wherein the universal balls on the first fixing seats are arranged in straight lines.

14. The lifting apparatus according to claim 12, wherein the plurality of fixing seats comprise a plurality of second fixing seats, wherein the universal balls on the plurality of second fixing seats are arranged in triangles.

15. The lifting apparatus according to claim 14, wherein triangular arrangements of the universal balls on the plurality of second fixing seats have at least two different orientations.

16. The lifting apparatus according to claim 1, wherein the lifting apparatus further comprises a second actuator and a clamping mechanism, and the second actuator is configured to drive the clamping mechanism to move between a clamping position and a releasing position.

17. The lifting apparatus according to claim 1, wherein the lifting apparatus further comprises a positioning mechanism, the positioning mechanism is fixed on the lifting component, the positioning mechanism comprises a third actuator and a positioning pin, and the third actuator is configured to be able to drive the positioning pin to move between an extension position and a retraction position along the second direction.

* * * * *